United States Patent
Kim et al.

(10) Patent No.: US 10,733,017 B2
(45) Date of Patent: Aug. 4, 2020

(54) TASK SCHEDULING BASED ON PERFORMANCE CONTROL CONDITIONS FOR MULTIPLE PROCESSING UNITS

(71) Applicant: Samsung Electronics Co., Ltd, Gyeonggi-do (KR)

(72) Inventors: Dohyoung Kim, Gyeonggi-do (KR); Joohwan Kim, Gyeonggi-do (KR); Hyunjin Park, Gyeonggi-do (KR); Changhwan Youn, Gyeonggi-do (KR); Donghee Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 15/115,641

(22) PCT Filed: Jan. 29, 2015

(86) PCT No.: PCT/KR2015/001001
§ 371 (c)(1),
(2) Date: Jul. 29, 2016

(87) PCT Pub. No.: WO2015/115852
PCT Pub. Date: Aug. 6, 2015

(65) Prior Publication Data
US 2017/0168872 A1    Jun. 15, 2017

(30) Foreign Application Priority Data

Jan. 29, 2014 (KR) .................... 10-2014-0011796

(51) Int. Cl.
*G06F 9/48* (2006.01)
*G06F 9/50* (2006.01)

(52) U.S. Cl.
CPC .......... *G06F 9/4893* (2013.01); *G06F 9/4887* (2013.01); *G06F 9/5088* (2013.01);
(Continued)

(58) Field of Classification Search
None
See application file for complete search history.

(56) References Cited

U.S. PATENT DOCUMENTS

| 4,223,380 A | 9/1980 | Antonaccio et al. |
| 4,318,174 A | 3/1982 | Suzuki et al. |

(Continued)

FOREIGN PATENT DOCUMENTS

| CN | 1860446 A | 11/2006 |
| EP | 2581830 A1 | 4/2013 |
| EP | 2919115 A2 | 9/2015 |

OTHER PUBLICATIONS

International Search Report dated May 11, 2015 in connection with International Patent Application No. PCT/KR2015/001001, 3 pages.

(Continued)

*Primary Examiner* — Abu Zar Ghaffari

(57) ABSTRACT

Provided is a task scheduling method. The method may include: assigning a task to one of first processing units functionally connected to an electronic device; and migrating, at least partially on the basis of a performance control condition related to the task, the task to one of second processing units for processing.

11 Claims, 5 Drawing Sheets

(52) U.S. Cl.
CPC .......... *G06F 9/5094* (2013.01); *G06F 9/4881* (2013.01); *G06F 2209/5022* (2013.01); *Y02D 10/22* (2018.01); *Y02D 10/32* (2018.01)

(56) References Cited

U.S. PATENT DOCUMENTS

| | | | | |
|---|---|---|---|---|
| 7,493,382 B2* | 2/2009 | Kudo | G06F 9/505 | 709/220 |
| 7,549,041 B2* | 6/2009 | Wang | G06F 9/4843 | 713/1 |
| 7,680,845 B2* | 3/2010 | Fujimoto | G06F 9/505 | 707/781 |
| 7,779,237 B2* | 8/2010 | Correale, Jr. | G06F 1/3203 | 712/221 |
| 7,898,545 B1* | 3/2011 | Alben | G06F 9/5044 | 345/519 |
| 8,010,822 B2* | 8/2011 | Marshall | G06F 1/3203 | 713/324 |
| 8,122,455 B2* | 2/2012 | Paul | G06F 9/5083 | 718/100 |
| 8,219,994 B2* | 7/2012 | Topaloglu | G06F 9/5094 | 712/229 |
| 8,387,066 B1* | 2/2013 | Becher | G06F 9/4881 | 709/223 |
| 8,489,744 B2* | 7/2013 | Elyashev | H04L 67/1002 | 709/226 |
| 8,656,406 B2* | 2/2014 | Nakayama | G06F 9/505 | 718/105 |
| 8,886,917 B1* | 11/2014 | Binkert | G06F 9/50 | 712/32 |
| 8,914,805 B2* | 12/2014 | Krishnamurthy | G06F 9/4881 | 718/105 |
| 8,970,525 B1* | 3/2015 | de los Reyes | G06F 3/016 | 345/173 |
| 9,000,956 B2* | 4/2015 | Goto | G06F 3/03547 | 341/20 |
| 9,043,795 B2* | 5/2015 | Morrow | G06F 9/5094 | 718/102 |
| 9,128,766 B1* | 9/2015 | Herington | G06F 1/3203 | |
| 9,269,281 B2* | 2/2016 | Matsui | G09G 5/02 | |
| 9,442,559 B2* | 9/2016 | Biswas | G06F 1/324 | |
| 9,443,095 B2* | 9/2016 | Lahteenmaki | G06F 21/74 | |
| 10,185,566 B2* | 1/2019 | Naveh | G06F 9/4856 | |
| 2003/0050955 A1* | 3/2003 | Eatough | H04L 12/1859 | 709/201 |
| 2005/0132239 A1 | 6/2005 | Athas et al. | | |
| 2006/0059484 A1* | 3/2006 | Selvaggi | G06F 9/4843 | 718/100 |
| 2006/0190942 A1 | 8/2006 | Inoue et al. | | |
| 2007/0067606 A1* | 3/2007 | Lin | G06F 9/5044 | 712/10 |
| 2008/0042982 A1* | 2/2008 | Gates | G06F 3/03543 | 345/173 |
| 2008/0115010 A1 | 5/2008 | Rothman et al. | | |
| 2009/0019449 A1 | 1/2009 | Choi et al. | | |
| 2009/0165007 A1* | 6/2009 | Aghajanyan | G06F 9/4881 | 718/103 |
| 2009/0187912 A1* | 7/2009 | Lee | G06F 9/4856 | 718/103 |
| 2009/0228893 A1* | 9/2009 | Behrendt | G06F 1/206 | 718/105 |
| 2010/0060586 A1* | 3/2010 | Pisula | G06F 3/04886 | 345/169 |
| 2010/0284106 A1* | 11/2010 | Kameda | G11B 19/04 | 360/69 |
| 2011/0004882 A1* | 1/2011 | Vengerov | G06F 9/5033 | 718/103 |
| 2011/0055838 A1 | 3/2011 | Moyes | | |
| 2011/0088041 A1* | 4/2011 | Alameldeen | G06F 9/505 | 718/105 |
| 2011/0119670 A1* | 5/2011 | Sugumar | G06F 9/5088 | 718/1 |
| 2012/0066688 A1 | 3/2012 | Chiang et al. | | |
| 2012/0264416 A1* | 10/2012 | Pica | H04W 52/0254 | 455/422.1 |
| 2013/0047004 A1* | 2/2013 | Hwang | G06F 1/329 | 713/300 |
| 2013/0086591 A1* | 4/2013 | Haven | G06F 9/44 | 718/102 |
| 2013/0097441 A1 | 4/2013 | Yamauchi et al. | | |
| 2013/0132972 A1* | 5/2013 | Sur | G06F 1/206 | 718/105 |
| 2013/0139170 A1* | 5/2013 | Prabhakar | G06F 9/4893 | 718/104 |
| 2013/0239119 A1* | 9/2013 | Garg | G06F 9/5083 | 718/105 |
| 2014/0006666 A1* | 1/2014 | Hiraki | G06F 9/4881 | 710/260 |
| 2014/0019656 A1 | 1/2014 | Hum et al. | | |
| 2014/0082630 A1* | 3/2014 | Ginzburg | G06F 15/7807 | 718/105 |
| 2014/0092031 A1* | 4/2014 | Schwartz | G06F 1/3206 | 345/173 |
| 2014/0108828 A1* | 4/2014 | Breternitz | G06F 1/329 | 713/300 |
| 2014/0130058 A1* | 5/2014 | Hum | G06F 1/3203 | 718/105 |
| 2014/0173623 A1* | 6/2014 | Chang | G06F 9/5088 | 718/105 |
| 2014/0181834 A1* | 6/2014 | Lim | G06F 9/5088 | 718/105 |
| 2014/0189297 A1* | 7/2014 | Narvaez | G06F 9/45558 | 712/29 |
| 2014/0196050 A1* | 7/2014 | Yu | G06F 9/5088 | 718/104 |
| 2015/0007187 A1* | 1/2015 | Shows | G06F 9/5088 | 718/104 |
| 2015/0040136 A1* | 2/2015 | Matthes | G06F 9/5094 | 718/104 |
| 2015/0121103 A1* | 4/2015 | Kanemasa | G06F 1/324 | 713/322 |
| 2017/0168872 A1* | 6/2017 | Kim | G06F 9/5088 | |

OTHER PUBLICATIONS

Written Opinion of the International Searching Authority dated May 11, 2015 in connection with International Patent Application No. PCT/KR2014/001001, 5 pages.
Supplementary European Search Report dated Jun. 15, 2018 in connection with European Patent Application No. 15 74 3396.
Rakesh Kumar et al., "Single-ISA Heterogeneous Multi-Core Architectures: The Potential for Processor Power Reduction", Proceedings of the 36th International Symposium on Microarchitecture (MICRO-36'03), Dec. 3-5, 2003, 12 pages.
Office Action dated Mar. 5, 2019 in connection with Chinese Patent Application No. 201580006490.9, 20 pages.
Communication pursuant to Article 94(3) EPC dated May 24, 2019 in connection with European Patent Application No. 15 743 396.2, 12 pages.

* cited by examiner

[Fig. 1]
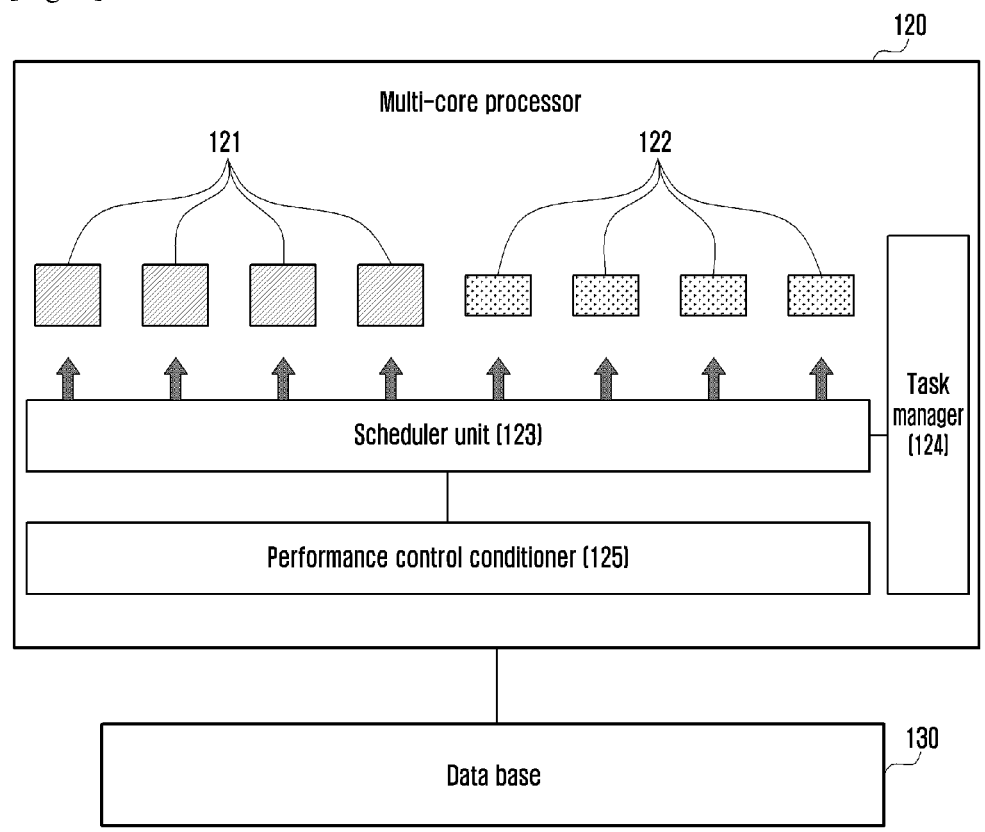
[Fig. 2]
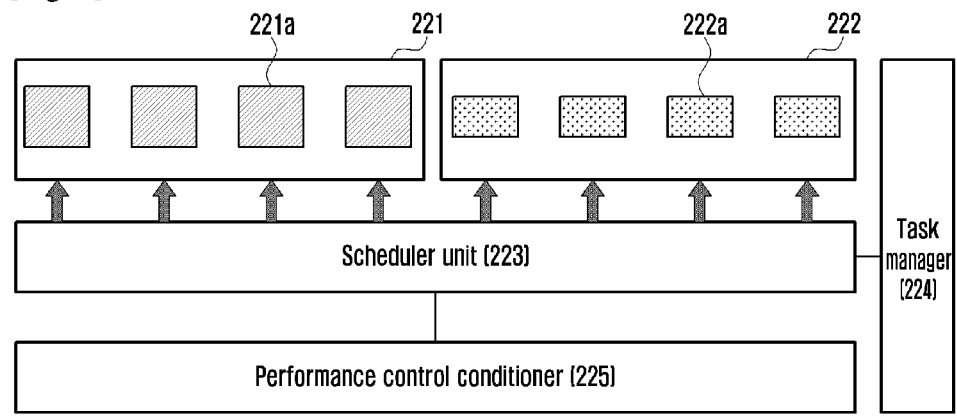

[Fig. 3]
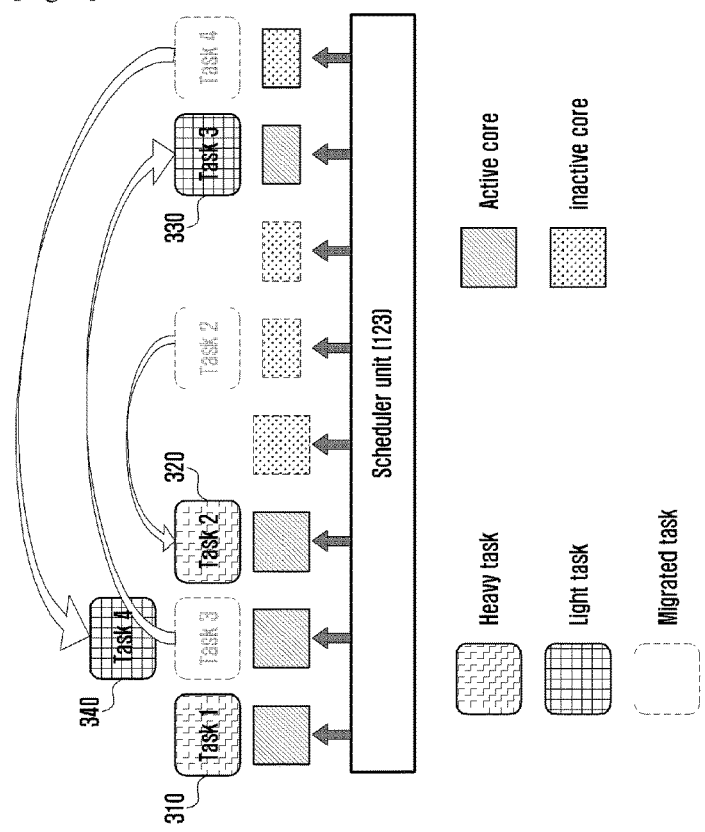
[Fig. 4]
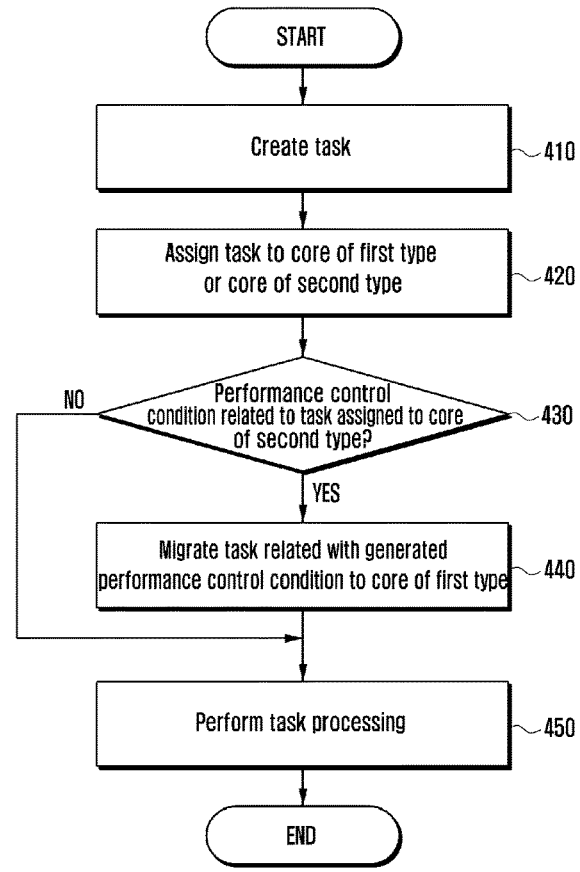

[Fig. 5]
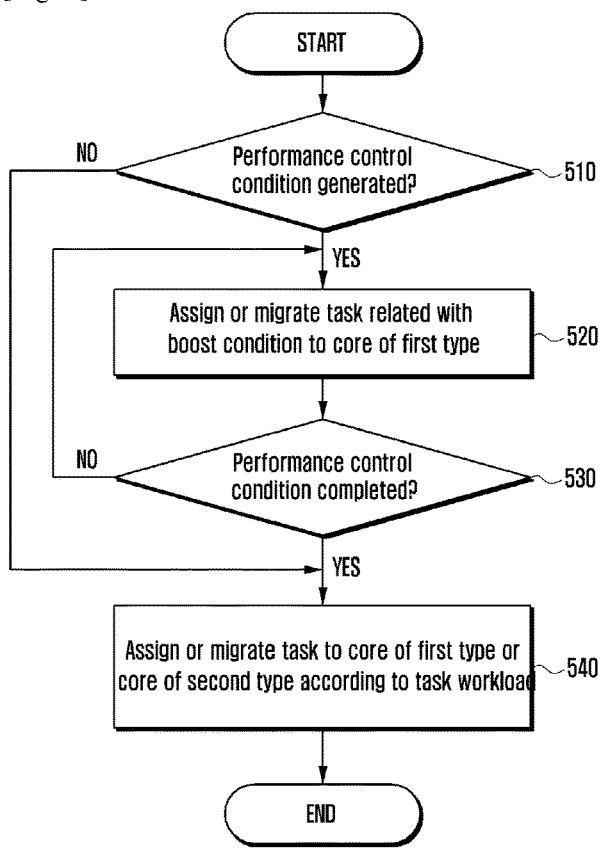
[Fig. 6]
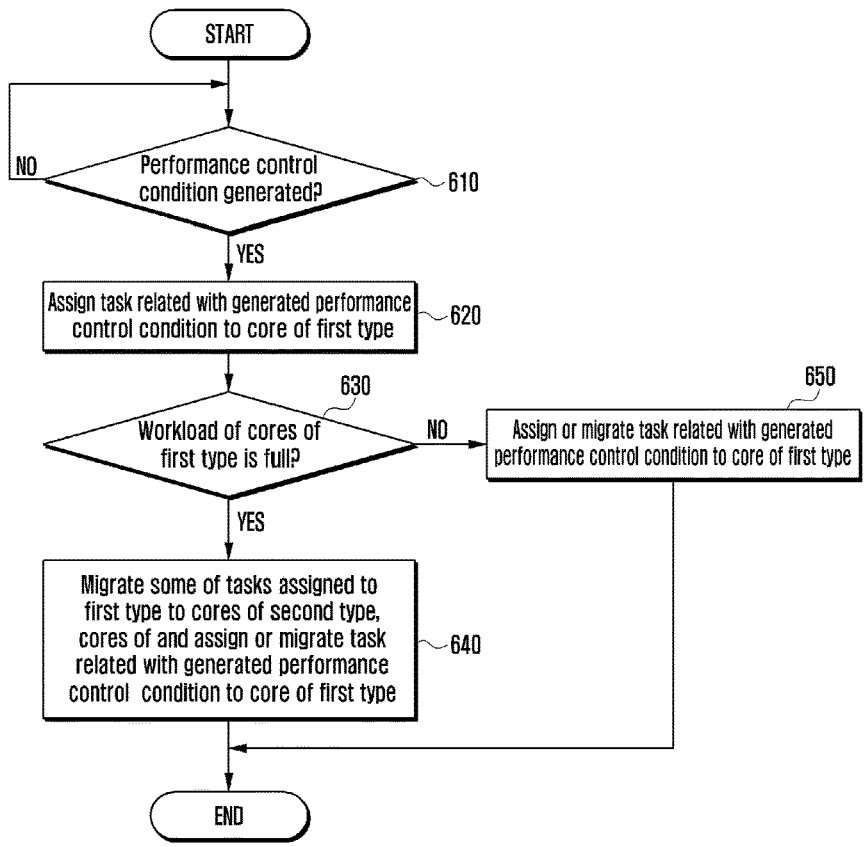

[Fig. 7]
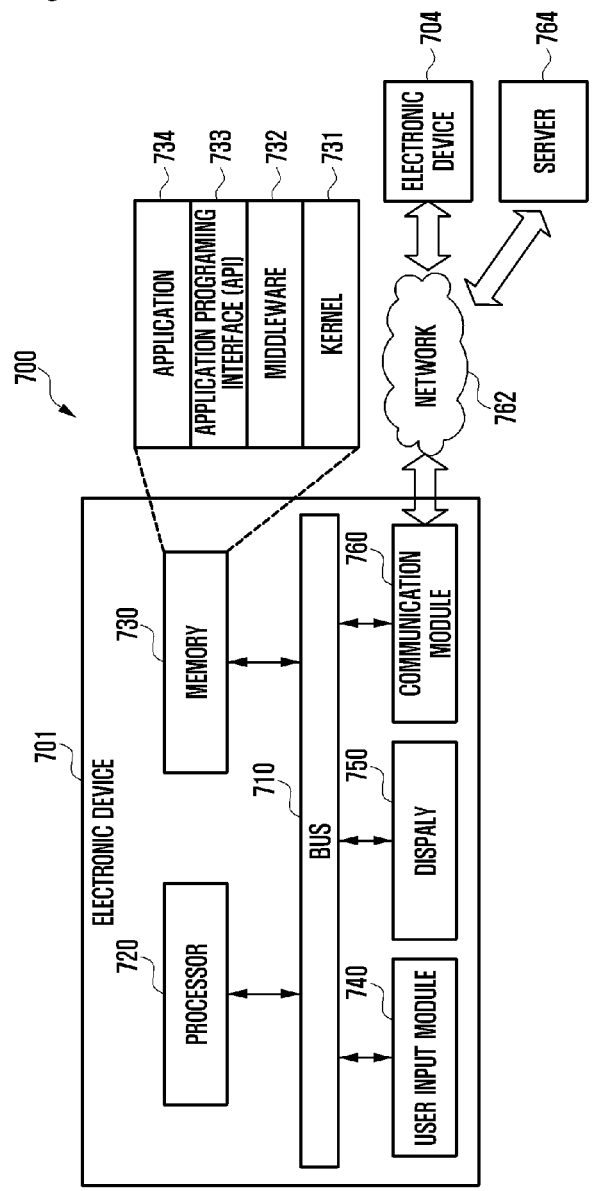

TASK SCHEDULING BASED ON PERFORMANCE CONTROL CONDITIONS FOR MULTIPLE PROCESSING UNITS

TECHNICAL FIELD

The present invention relates to a method and apparatus for scheduling tasks in a multiprocessor system environment.

BACKGROUND ART

With recent advances in the processor technology, single-core processors have evolved into multi-core processors. A multiprocessor may increase execution performance of an application by running multiple tasks at the same time through parallelization.

DISCLOSURE OF INVENTION

Technical Problem

In a multiprocessor system, one operating system determines the order of execution of processors through scheduling to process multiple tasks.

Solution to Problem

In accordance with an aspect of the present invention, a method for scheduling tasks using multiple processing units is provided. The method may include: assigning a task to one of first processing units functionally connected to an electronic device; and migrating, at least partially on the basis of a performance control condition related to the task, the task to one of second processing units for processing.

In accordance with another aspect of the present invention, an electronic device is provided. The electronic device may include: first processing units; second processing units; a scheduler unit configured to assign a task to a first processing unit; and a performance control conditioner to detect generation of a performance control condition related to the task, wherein the scheduler unit migrates the task to a second processing unit for processing at least partially on the basis of a performance control condition.

In a feature of the present invention, the task scheduling method and apparatus may assign or migrate a task to a high performance processing unit as necessary regardless of the workload of processing units to process tasks to thereby increase system performance while reducing unnecessary energy consumption.

Advantageous Effects of Invention

An aspect of the present invention is to provide a scheme that can assign, when a performance control condition is generated, the task in which the performance control condition is generated to a preset processing unit regardless of workload.

Another aspect of the present invention is to provide a task scheduling method and apparatus that can increase system performance by controlling task processing as necessary in a processor environment including heterogeneous processing units.

BRIEF DESCRIPTION OF DRAWINGS

FIG. 1 illustrates a configuration of a multi-processing unit system according to various embodiments.

FIG. 2 illustrates a configuration of a multi-processing unit system according to various embodiments.

FIG. 3 illustrates overall task handling operation in a multi-processing unit system according to various embodiments.

FIG. 4 illustrates a method for task assignment in a multi-processing unit system according to various embodiments.

FIG. 5 illustrates a method for task assignment in a multi-processing unit system according to various embodiments.

FIG. 6 illustrates a method for task assignment in a multi-processing unit system according to various embodiments.

FIG. 7 illustrates a network environment including electronic devices according to various embodiments.

BEST MODE FOR CARRYING OUT THE INVENTION

Figure 8:
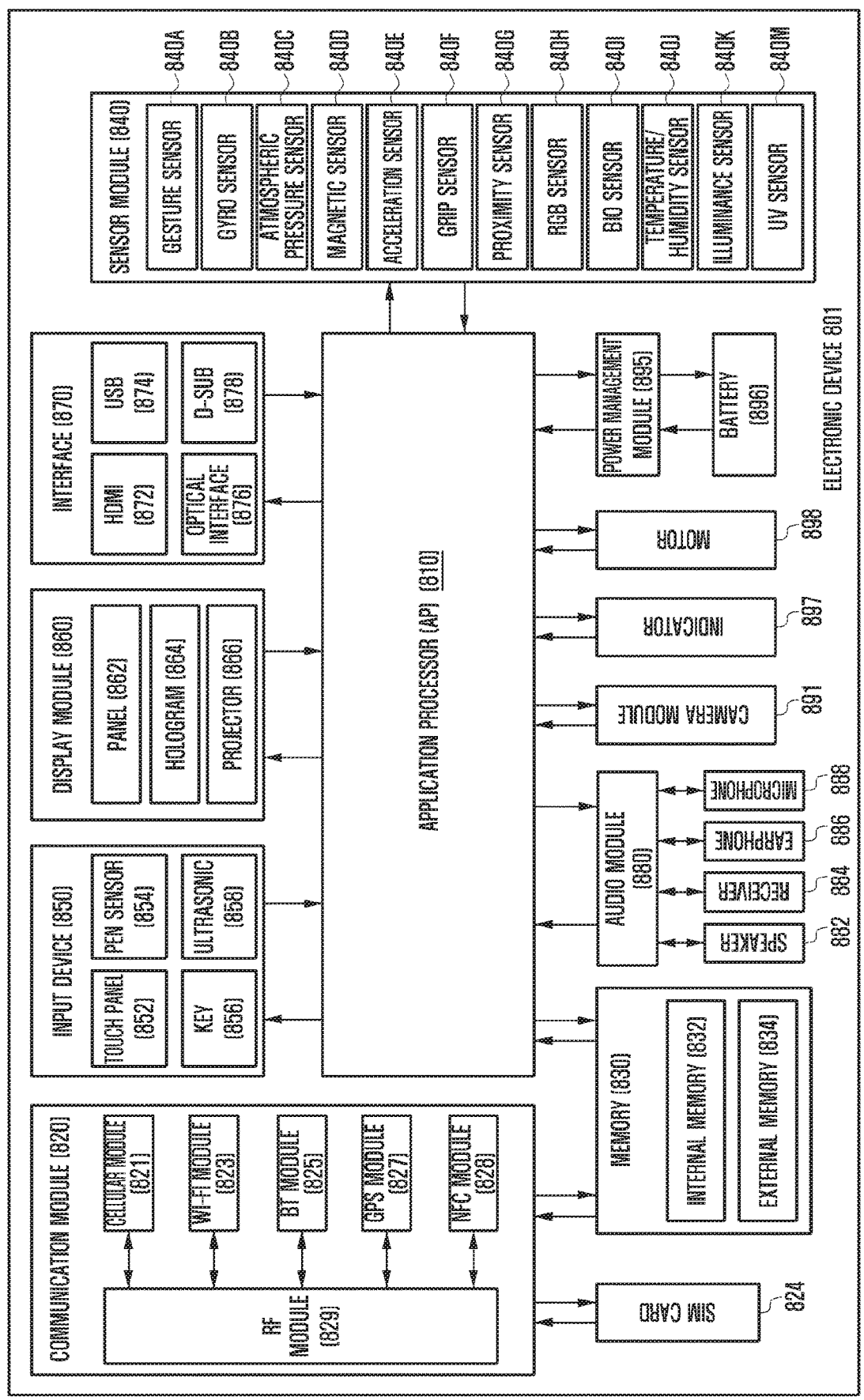
FIG. 8 is a block diagram of an electronic device according to various embodiments.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

In the present invention, the expression "and/or" is taken as specific invention of each and any combination of enumerated things. For example, A and/or B is to be taken as specific invention of each of A, B, and A and B.

As used herein, terms such as "first," "second," etc. are used to describe various components but not restrict the corresponding components. However, it is obvious that the components should not be defined by these terms. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the invention. As used herein, the singular forms are intended to include the plural forms as well, unless the context clearly indicates otherwise.

Unless otherwise defined, all terms used herein have the same meaning as commonly understood by one of ordinary skill in the art to which this invention pertains, and should be interpreted neither as having an excessively comprehensive meaning nor as having an excessively contracted meaning. The general terms used herein should be interpreted according to the definitions in the dictionary or in the context and should not be interpreted as an excessively contracted meaning.

In the following description, the electronic device may be a device having a communication function. Examples of the electronic device may include at least one of a smartphone, a tablet PC, a mobile phone, a video phone, an electronic book (ebook) reader, a desktop PC, a laptop PC, a netbook PC, a Personal Digital Assistant (PDA), a Portable Multimedia Player (PMP), an MP3 player, a mobile medical appliance, a camera, a wearable device (e.g. head-mounted-device (HMD) such as electronic glasses), an electronic clothing, an electronic bracelet, an electronic neckless, an appcessory, an electronic tattoo, and a smart watch.

According to certain embodiments, examples of the electronic device may be a smart home appliance having a communication function. Examples of the smart home appliance may include at least one of a television, a Digital Video Disk (DVD) player, an audio player, a refrigerator, an air conditioner, a cleaner, an oven, a microwave oven, a laundry machine, an air cleaner, a set-top box, a TV box (e.g. Samsung HomeSync™, Apple TV™, and Google TV™), a game console, an electronic dictionary, an electronic key, a camcorder, and an electronic frame.

According to certain embodiments, examples of the electronic device may include at least one of a medical appliance (e.g. Magnetic Resonance Angiography (MRA), Magnetic Resonance Imaging (MRI), Computed Tomography (CT), camera, and ultrasonic device), a navigation device, a Global Positioning System (GPS) receiver, an Event Data Recorder (EDR), a Flight Data Recorder (FDR), a car infotainment device, an electronic equipment for ship (e.g. marine navigation device and gyro compass), avionics device, security device, a Head Up Display (HUD), an industrial or home robot, an Automatic Teller Machine (ATM) of a financial institution, and a Point Of Sales (POS).

According to certain embodiments, examples of the electronic device may include furniture or part of building/construction which has a communication function, an electronic board, an electronic signature receiving device, a projector, and a metering device (e.g. water, electricity, and electric wave metering devices). According to an embodiment, the electronic device may be one or any combination of the above enumerated devices. According to an embodiment, the electronic device may be a flexible device. However, it is obvious to those in the art that the electronic device of the present invention is not limited to the above devices.

A description is made of the electronic device according to various embodiments with reference to accompanying drawings hereinafter. In the description of the various embodiments, the term 'user' may denote a person or a device (e.g. intelligent electronic device) which uses the electronic device.

In various embodiments, the electronic device may include a heterogeneous multi-core processor having at least two cores of different types. The multi-core processor may be composed of different processing units such as X86, X64, ARM, GPU and DSP.

In various embodiments, a "processor" includes at least one core, and may be defined as an independent entity capable of cooperating with other components of the device.

In various embodiments, a "processing unit" may be defined as a minimum entity that can interpret and execute instructions in a processor, and may be used interchangeably with a "core".

Next, a multiprocessor system and an electronic device having a multiprocessor system are described as various embodiments with reference to the drawings.

FIG. 1 illustrates a configuration of a multi-processing unit system 100 according to various embodiments.

Referring to FIG. 1, the multi-processing unit system 100 may include a multi-core processor 120 and a database 130.

The multi-core processor 120 may include one or more first processing units 121, one or more second processing units 122, a scheduler unit 123, a task manager 124, and a performance control conditioner 125.

The first processing units 121 and the second processing units 122 may process tasks assigned by the scheduler unit 123. Here, a task refers to an executable job with a separate program section (e.g. code and stack).

The first processing units 121 may be high-performance big cores (e.g. Cortex-A15 cores). The second processing units 122 may be low-power little cores (e.g. Cortex-A7 cores).

In various embodiments, the multi-core processor 120 may include two or more processing units of different types. For example, the multi-core processor 120 may include a first processing unit, a second processing unit, a third processing unit, and a combination thereof.

The task manager 124 may select one of the first processing unit 121 and the second processing unit 122 to process a task according to task information and workload, and may arrange tasks according to their priorities. The task manager 124 may select a core to process a task and assign the task to the selected core.

In various embodiments, the scheduler unit 123 may assign a newly created task to a low-power core (e.g. one of the second processing units 122) for processing.

When the workload of a task processed by one of the second processing units 122 exceeds a threshold value, the scheduler unit 123 may migrate the task whose workload exceeds the threshold value to one of the first processing units 121. For example, the scheduler unit 123 may deactivate one of the second processing units 121 to which the task to be migrated is assigned (source core), activate one of the first processing units 121 (target core), and migrate the task from the deactivated source core to the activated target core.

In response to an execution request for a task, the scheduler unit 123 may assign the task to a high-performance core (e.g. one of the first processing units 121) when the workload of the task is above the threshold value, and assign the task to a low-power core (e.g. one of the second processing units 122) when the workload of the task is below the threshold value.

In various embodiments, when a performance control condition is generated in a running task or created task, the scheduler unit 123 may assign the task related with the performance control condition to a first processing unit 121 or migrate the task processed by a second processing unit 122 to a first processing unit 121.

The task manager 124 may create, remove and change a task according to a user request or preset schedule. The task manager 124 may monitor task processing of the first processing units 121 and the second processing units 122, and store monitored information in the database 130. For example, when the user executes a function of an application in the electronic device, the task manager 124 may create a task corresponding to the application function and transfer task creation information to the scheduler unit 123. The scheduler unit 123 may assign the created task to one of the first processing units 121 and the second processing units 122 according to schedule settings, causing the task to be processed.

The task manager 124 may monitor workload of the first processing units 121 and second processing units 122 processing assigned tasks and check whether the workload due to tasks is above a threshold value. When the workload of the first processing units 121 becomes less than or equal to a threshold value, the task manager 124 may notify this to the scheduler unit 123. When the workload of the second processing units 122 becomes greater than a threshold value, the task manager 124 may notify this to the scheduler unit 123.

In various embodiments, the threshold value for migrating a task from a first processing unit 121 to a second processing unit 122 (downward migration) may be different from the threshold value for migrating a task from a second processing unit 122 to a first processing unit 121 (upward migration).

The performance control conditioner 125 may detect generation of a performance control condition in relation to a task. When a performance control condition is generated, the performance control conditioner 125 may notify this to the scheduler unit 123. To detect a task state change, the performance control conditioner 125 may monitor the task manager 124 and other components (e.g. input interface and power control unit). For example, the performance control conditioner 125 may monitor booting of the operating system due to power on, generation of a touch input signal for an application, issuance of an application execution request, loading of website information, downloading or uploading of content, battery current drop below a threshold, wired or wireless data transmission, and the like.

The database 130 may store task information, performance information of the first processing units 121 and the second processing units 122, task processing cost information, schedule setting information, and the like.

FIG. 2 illustrates a multi-processing unit system according to various embodiments.

Referring to FIG. 2, the multi-processing unit system may include a first processor 221, a second processor 222, a scheduler unit 223, a task manager 224, and a performance control conditioner 225.

In various embodiments, the first processor 221 may include first processing units 221*a*, and the second processor 222 may include second processing units 222*a*. For example, the first processor 221 may be composed of multiple high-performance big cores (e.g. Cortex-A15 cores), and the second processor 222 may be composed of multiple low-power little cores (e.g. Cortex-A7 cores). However, the present invention is not limited thereto.

In various embodiments, the first processor 221 and the second processor 222 may include cores of the same type.

In various embodiments, the multi-processing unit system may further include one or more processors composed of heterogeneous processing units.

The cores of the first processor 221 and second processor 222 may process tasks assigned by the scheduler unit 223.

The scheduler unit 223 may assign tasks to the first processor 221 and the second processor 222 according to task information and workload or may arrange tasks according to priority. The scheduler unit 223 may select one of the cores of the processors and assign a task to the selected core.

The scheduler unit 223, the task manager 224 and the performance control conditioner 225 are identical in operation and function to the scheduler unit 123, the task manager 124 and the performance control conditioner 125 described in FIG. 1, respectively, and a description thereof is omitted.

FIG. 3 illustrates overall task handling operation in a multi-processing unit system according to various embodiments.

Referring to FIG. 3, in the multi-processing unit system, the scheduler unit may assign a task to one of the first processing units and the second processing units.

In various embodiments, when a task containing one or more threads is created, the scheduler unit may assign the task to a second processing unit regardless of task information.

In various embodiments, the scheduler unit may be configured to assign a task with a high load to a first processing unit according to task information. The scheduler unit may be configured to assign a task with a low load to a second processing unit.

When the workload of a task processed by a second processing unit exceeds a threshold value, the scheduler unit may be configured to migrate the task whose workload exceeds the threshold value to a first processing unit. When the workload of a task processed by a first processing unit becomes less than or equal to a threshold value, the scheduler unit may be configured to migrate the task whose workload is less than or equal to the threshold value to a second processing unit.

When a performance control condition is generated in a task assigned to a second processing unit, the scheduler unit may be configured to migrate the task in which the performance control condition is generated to a first processing unit regardless of the workload.

For example, referring to FIG. 3, first and second tasks 310 and 320 with a high load (e.g. heavy task), and third and fourth tasks 330 and 340 with a low load (e.g. light task) may be present in the multi-processing unit system. A core with an assigned task may be an active core, and a core without an assigned task may be an inactive core.

As the first task 310 is a task with a high load, it may be assigned to one of the first processing units. As the second task 320 is a task with a low load, it may be assigned to one of the second processing units.

The task manager may monitor state changes of tasks to identify changes in the workload of tasks. The performance control conditioner may detect generation of a performance control condition in relation to a task.

The second task 320 may change in load from a load below or equal to a threshold value to a load above the threshold value. The scheduler unit may recognize that the load of the second task 320 is above the threshold value. As such, the scheduler unit may migrate the second task 320 from a second processing unit to a first processing unit.

The third task 330 may be assigned to one of the first processing units as its load is determined to be above a threshold value. Later, the load thereof may become below or equal to the threshold value. In this case, the scheduler unit may migrate the third task 330 from a first processing unit to a second processing unit.

The fourth task 340 having a load below or equal to a threshold value may be assigned to one of the second processing units. The performance control conditioner may detect generation of a performance control condition in relation to the fourth task 340. The performance control conditioner may notify generation of a performance control condition to the scheduler unit. In response to generation of a performance control condition, the scheduler unit may migrate the fourth task 340 with a low load to one of the first processing units regardless of workload.

In various embodiments, when a preset duration expires after generation of the performance control condition or the performance control condition is completed, the scheduler unit may re-assign the fourth task 340 to one of the second processing units for continued processing.

FIG. 4 illustrates a method for task assignment in a multi-processing unit system according to various embodiments.

Referring to FIG. 4, at operation 410, the multi-processing unit system creates a task according to a user request or preset schedule. For example, when the operating system is booted upon power on of the electronic device, the multi-processing unit system may create a task corresponding to the boot function. The multi-processing unit system may also create a task in relation to a user request for application execution.

At operation 420, the multi-processing unit system assigns the created task to a first processing unit or a second processing unit. For example, the multi-processing unit system may assign the task to one of the second processing units (cores). As another example, the multi-processing unit system may assign a task with a high load to one of the first processing units, and assign a task with a low load to one of the second processing units.

At operation 430, the multi-processing unit system checks whether a performance control condition is generated in relation to a task assigned to a second processing unit. The performance control condition may correspond to at least one of booting of the operating system due to power on of the electronic device, detection of a touch input for an application, initiation of application execution, loading of a website, downloading or uploading of content, remaining battery power falling below a threshold, and wired or wireless data transmission. If a performance control condition is generated in relation to a task assigned to a second processing unit, at operation 440, the multi-processing unit system migrates the task in which the performance control condition is generated from a second processing unit to a first processing unit. At operation 450, the multi-processing unit system causes the first processing units and second processing units to process tasks assigned thereto.

FIG. 5 illustrates a method for task assignment in a multi-processing unit system according to various embodiments.

Referring to FIG. 5, at operation 510, the multi-processing unit system checks whether a performance control condition is generated in relation to a task. For example, in the multi-processing unit system, a performance control condition may be generated in relation to a task created according to a task creation request or in relation to a running task assigned to a first processing unit or a second processing unit.

At operation 520, the multi-processing unit system assigns the task related with the generated performance control condition to a first processing unit or migrates the same from a second processing unit to a first processing unit. For example, when the operating system of the electronic device is booted, a number of tasks may be generated according to a preset schedule. Upon generation of a performance control condition (e.g. booting), the multi-processing unit system may assign the tasks generated for booting to the first processing units, causing the tasks to be processed.

As another example, when a performance control condition (e.g. touch input) is generated in a running task assigned to a second processing unit, the multi-processing unit system may migrate the task from a second processing unit to a first processing unit, increasing processing performance for the touch input.

At operation 530, the multi-processing unit system checks whether the performance control condition is completed. Completion of a performance control condition may correspond to expiration of a given time, no touch input for a preset time, termination of application execution, completion of website loading, completion of content downloading or uploading, remaining battery power above a threshold, or wired or wireless data transmission. For example, the multi-processing unit system may set a time duration for application of performance control. When a task is assigned or migrated to a first processing unit after generation of a performance control condition, the multi-processing unit system may check expiration of the time duration. When a boost is applied to a task to increase touch input performance, the multi-processing unit system may check whether no touch input for the task is received for a preset duration.

If the performance control condition is completed, at operation 540, the multi-processing unit system assigns the corresponding task to a first processing unit or second processing unit or migrate the same to a second processing unit according to the workload. If the performance control condition is not completed, the procedure returns to operation 520.

If a performance control condition is not generated at operation 510, the procedure proceeds to operation 540 at which the multi-processing unit system performs task assignment or migration according to the workload. For example, the multi-processing unit system may assign a task with a high load to one of the first processing units, and assign a task with a low load to one of the second processing units.

FIG. 6 illustrates a method for task assignment in a multi-processing unit system according to various embodiments.

Referring to FIG. 6, at operation 610, the multi-processing unit system checks whether a performance control condition is generated in relation to a task. At operation 620, the multi-processing unit system assigns the task related with the generated performance control condition to a first processing unit. If the generated performance control condition is related to a running task assigned to a second processing unit, the multi-processing unit system may migrate the task from the second processing unit to a first processing unit. At operation 630, the multi-processing unit system checks whether the workload of the first processing units is full. If the workload of the first processing units is full, at operation 640, the multi-processing unit system migrates some of the tasks assigned to the first processing units to the second processing units, and assigns or migrates a task related with a generated performance control condition to the first processing units.

If the workload of the first processing units is not full at operation 630, the multi-processing unit system assigns or migrates the task related with the generated performance control condition to a first processing unit. FIG. 7 is a diagram illustrating the network architecture including the electronic device according to various embodiments of the present invention.

Referring to FIG. 7, the electronic device 701 includes a bus 710, a processor 720, a memory 730, an input/output interface 740, a display 750, a communication interface 760, and a text display control module 770.

The bus 710 may be a circuitry which connects the aforementioned components to each other to communicate signals (e.g. control messages) therebetween.

The processor 720 receives a command from any of the aforementioned components (e.g. memory 730, input/output interface 740, display 750, and communication interface 760) through the bus 710, interprets the command, and executes operation or data processing according to the decrypted command. The processor 710, for example, may implement as a multi-processing unit 120 described in FIG. 1 or a multi-processing unit 220 described in FIG. 2.

The memory 730 may store the command or data received from the processor 720 or other components (e.g. input/output interface 740, display 750, communication interface 760, etc.) or generated by the processor 720 or other components. The memory 730 may store program modules including kernel 731, middleware 732, Application Programming Interface (API) 733, applications 734, etc. Each programing module may be implemented as software, firmware, hardware, and any combination thereof.

The kernel 731 may control or manage the system resources (e.g. bus 710, processor 720, and memory 730) for use in executing the operation or function implemented with the middleware 732, the API 733, or the application 734. The kernel 731 also may provide an interface allowing the middleware 732, API 733, or application 734 to access the components of the electronic device 701 to control or manage.

The middleware 732 may work as a relay of data communicated between the API 733 or application 734 and the kernel 731. The middle 732 may execute control of the task requests from the applications 734 in such a way of assigning priority for use of the system resource (e.g. bus 710, processor 720, and memory 730) of the electronic device to at least one of the applications 734.

The API 733 is the interface for the applications 734 to control the function provided by the kernel 731 or the middleware 732 and may include at least one interface or function (e.g. command) for file control, window control, image control, or text control.

According to various embodiments, the applications 734 may include Short Messaging Service/Multimedia Messaging Service (SMS/MMS) application, email application, calendar application, alarm application, health care application (e.g. application of measuring quantity of motion or blood sugar level), and environmental information application (e.g. atmospheric pressure, humidity, and temperature applications). Additionally or alternatively, the application 734 may be an application related to information exchange between the electronic device 701 and other external electronic device (e.g. electronic device 704). Examples of the information exchange application may include a notification relay application for relaying specific information to the external electronic device 704 and a device management application for managing the external electronic device.

For example, the notification relay application may be provided with a function of relaying the alarm information generated by the other applications (e.g. SMS/MMS application, email application, health care application, and environmental information application) of the electronic device to an external electronic device (e.g. electronic device 704). Additionally or alternatively, the notification relay application may provide the user with the notification information received from an external electronic device (e.g. electronic device 704). The electronic device application may manage (e.g. install, delete, and update) the function of an external electronic device (e.g. turn-on/off of the electronic device 704 itself (or a part of it) or adjustment of the brightness (or resolution) of the display) which communicates with the electronic device 701 or the service (e.g. communication or messaging service) provided by the external electronic device or an application running on the external device.

According to various embodiments, the applications 734 may include an application designated according to the property (e.g. type) of an external electronic device (electronic device 704). If the external electronic device is the MP3 player, the applications 734 may include a music playback application. Similarly, if the external electronic device is a mobile medical appliance, the applications 734 may include a heal care application. According to an embodiment, the application 734 may include at least one of applications designated to the electronic device 701 or the applications received from the external electronic device (e.g. server 706 and electronic device 704).

The input/output interface 740 delivers the command or data input by the user through with an input/output device (e.g. sensor, keyboard, and touchscreen) to the processor 720, memory 730, and/or communication interface 760, through the bus 710. For example, the input/output interface 740 may provide the processor 720 with the data corresponding to the touch may by the user on the touchscreen. The input/output interface 740 may output the command or data (which is received from the processor 720, memory 730, or communication interfaced 760, through the bus 710) through the input/output device (e.g. speaker and display). For example, the input/out interface 740 may output the voice data processed by the processor 720 to the user through the speaker.

The display 750 may present various information (e.g. multimedia data and text data) to the user.

The communication interface 760 may establish a communication connection of the electronic device 701 with an external device (e.g. electronic device 704 and server 706). For example, the communication interface 760 connects to the network 762 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 762 may be a telecommunication network. The communication network may include at least one of computer network, Internet, Internet of Things, and telephone network. According to an embodiment, the communication protocol between the electronic device 701 and an external device (e.g. transport layer protocol, data link layer protocol, and physical layer protocol) may be supported by at least one of the applications 734, API 733, middleware 732, kernel 731, and communication interface 760.

FIG. 8 is a block diagram illustrating a configuration of the electronic device according to various embodiments of the present invention. The electronic device 701 may be of the whole or a part of the electronic device 701.

Referring to FIG. 8, the electronic device 801 may include an Application Processor (AP) 810, a communication module 820, a Subscriber Identity Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may operate an Operating System (OS) and/or application programs to control a plurality of hardware and/or software components connected to the AP 810 and perform data-processing and operations on multimedia data. For example, the AP 810 may be implemented in the form of System on Chip (SoC). According to an embodiment, the AP 810 may include a Graphic Processing Unit (GPU) (not shown).

The communication module 820 (e.g. communication interface 160) may perform data communication with other electronic devices (e.g. electronic device 104 and server 106) through a network. According to an embodiment, the communication module 820 may include a cellular module 821, a Wi-Fi module 823, a BT module 825, a GPS module 827, an NFC module 828, and a Radio Frequency (RF) module 829

The cellular module 821 is responsible for voice and video communication, text messaging, and Internet access services through a communication network (e.g. LTE, LTE-A, CDMA, WCDMA, UMTS, WiBro, and GSM networks). The cellular module 821 may perform identification and authentication of electronic devices in the communication network using the SIM card 824. According to an embodiment, the cellular module 821 may perform at least one of the functions of the AP 810. For example, the cellular module 821 may perform at least a part of the multimedia control function.

According to an embodiment, the cellular module 821 may include a Communication Processor (CP). The cellular module 821 may be implemented in the form of SOC. Although the cellular module 821 (e.g. communication processor), the memory 830, and the power management module 895 are depicted as independent components separated from the AP 810, the present invention is not limited thereto but may be embodied in a way that the AP includes at least one of the components (e.g. cellular module 821).

According to an embodiment, each of the AP 810 and the cellular module 821 (e.g. communication processor) may load a command or data received from at least one of the components on a non-volatile or volatile memory and process the command or data. The AP 810 or the cellular module 821 may store the data received from other components or generated by at least one of other components in the non-volatile memory.

Each of the Wi-Fi module 823, the BT module 825, the GPS module 827, and the NFC module 828 may include a processor for processing the data it transmits/receives. Although the cellular module 821, the Wi-Fi module 823, the BT module 825, the GPS module 827, and the NFC module 828 are depicted as independent blocks; at least two of them (e.g. communication processor corresponding to the cellular module 821 and Wi-Fi processor corresponding to the Wi-Fi module 823) may be integrated in the form of SoC.

The RF module 829 is responsible for data communication, e.g. transmitting/receiving RF signals. Although not depicted, the RF module 829 may include a transceiver, a Power Amp Module (PAM), a frequency filter, and a Low Noise Amplifier (LNA). The RF module 829 also may include the elements for transmitting/receiving electric wave in free space, e.g. conductor or conductive wire. Although FIG. 8 is directed to the case where the Wi-Fi module 923, the BT module 825, the GPS module 827, and the NFC module 828 are sharing the RF module 829, the present invention is not limited thereto but may be embodied in a way that at least one of the Wi-Fi module 823, the BT module 825, the GPS module 827, and the NFC module 828 transmits/receives RF signals an independent RF module.

The SIM card 824 may be designed so as to be inserted into a slot formed at a predetermined position of the electronic device. The SIM card 824 may store unique identity information (e.g. Integrated Circuit Card Identifier (ICCID)) or subscriber information (e.g. International Mobile Subscriber Identity (IMSI)).

The memory 830 (e.g. memory 130) may include at least one of the internal memory 832 and an external memory 834. The internal memory 832 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 832 may be a Solid State Drive (SSD). The external memory 834 may be a flash drive such as Compact Flash (CF), Secure Digital (SD), micro-SD, Mini-SD, extreme Digital (xD), and Memory Stick. The external memory 834 may be connected to the electronic device 801 through various interfaces functionally. According to an embodiment, the electronic device 801 may include a storage device (or storage medium) such as hard drive.

The sensor module 840 may measure physical quantity or check the operation status of the electronic device 801 and convert the measured or checked information to an electric signal. The sensor module 840 may include at least one of gesture sensor 840A, Gyro sensor 840B, atmospheric pressure sensor 840C, magnetic sensor 840D, acceleration sensor 840E, grip sensor 840F, proximity sensor 840G, color sensor 840H (e.g. Red, Green, Blue (RGB) sensor), bio sensor 840I, temperature/humidity sensor 840J, illuminance sensor 840K, and Ultra Violet (UV) sensor 840M. Additionally or alternatively, the sensor module 840 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 840 may further include a control circuit for controlling at least one of the sensors included therein.

The input device 850 may include a touch panel 852, a (digital) pen sensor 854, keys 856, and an ultrasonic input device 858. The touch panel 852 may be one of capacitive, resistive, infrared, microwave type touch panel. The touch panel 852 may include a control circuit. In the case of the capacitive type touch panel, it is possible to detect physical contact or approximation. The touch panel 852 may further include a tactile layer. In this case, the touch panel 852 may provide the user with haptic reaction.

The (digital) pen sensor 854 may be implemented with a sheet with the same or similar way as touch input of the user or a separate recognition sheet. The keys 856 may include physical buttons, optical key, and keypad. The ultrasonic input device 858 is a device capable of checking data by detecting sound wave through a microphone 888 and may be implemented for wireless recognition. According to an embodiment, the electronic device 801 may receive the user input made by means of an external device (e.g. computer or server) connected through the communication module 820.

The display 860 (e.g. display module 150) may include a panel 862, a hologram device 864, and a projector 866. The panel 862 may be a Liquid Crystal Display (LCD) panel or an Active Matrix Organic Light Emitting Diodes (AMO-LED) panel. The panel 862 may be implemented so as to be flexible, transparent, and/or wearable. The panel 862 may be implemented as a module integrated with the touch panel 852. The hologram device 864 may present 3-dimentional image in the air using interference of light. The projector 866 may project an image to a screen. The screen may be placed inside or outside the electronic device. According to an embodiment, the display 860 may include a control circuit for controlling the panel 862, the hologram device 864, and the projector 866.

The interface 870 may include a High-Definition Multimedia Interface (HDMI) 872, a Universal Serial Bus (USB) 874, an optical interface 876, and a D0subminiature (D-sub) 878. The interface 870 may include the communication interface 160 as shown in FIG. 1. Additionally or alternatively, the interface 870 may include a Mobile High-definition Link (MHL) interface, a SD/MMC card interface, and infrared Data Association (irDA) standard interface.

The audio module 880 may convert sound to electric signal and vice versa. At least a part of the audio module 880 may be included in the input/output interface 140 as shown in FIG. 1. The audio module 880 may process the audio information input or output through the speaker 882, the receiver 884, the earphone 886, and the microphone 888.

The camera module 891 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 895 may manage the power of the electronic device 801. Although not shown, the power management module 895 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 896, charging voltage, current, and temperature. The battery 896 may store or generate power and supply the stored or generated power to the electronic device 801. The battery 896 may include a rechargeable battery or a solar battery.

Also, the text display method and apparatus of an electronic device of the present invention is advantageous in terms of improving the legibility of the text in such a way of enlarging, when a folded paragraph is stretched, the font size of the paragraph or highlighting the paragraph.

The above enumerated components of the electronic device of the present invention may be implemented into one or more parts, and the names of the corresponding components may be changed depending on the kind of the electronic device. The electronic device of the present invention may include at least one of the aforementioned components with omission or addition of some components. The components of the electronic device of the present invention may be combined selectively into an entity to perform the functions of the components equally as before the combination.

The term "module" according to the embodiments of the invention, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

According to various embodiments of the present invention, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programing module may be implemented (e.g. executed) by the processor 120. At least part of the programing module may include modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present invention.

The module or programming module of the present invention may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for scheduling tasks using a heterogeneous multiple processor cores including first processor cores and second processor cores in an electronic device, the method comprising:

generating a plurality of tasks based on executing an application;
classifying the plurality of tasks based on workload performance of each task into high-workload tasks or low-workload tasks, wherein the high-workload tasks are assigned to the first processor cores and the low-workload tasks are assigned to the second processor cores, and wherein the workload performance of the high-workload tasks is above a threshold value, and the workload performance of the low-workload tasks is below or equal to the threshold value;
detecting a touch input related to the application, while processing the high-workload tasks in the first processor cores and the low-workload tasks in the second processor cores;
in response to the touch input, migrating a portion of the low-workload tasks from the second processor cores to the first processor cores regardless of a power level of the electronic device;
processing the migrated portion of the low-workload tasks and the high-workload tasks in the first processor cores; and
when no touch input is detected for a preset time in connection with the application, migrating a portion of the low-workload tasks that migrated to the first processor cores to the second processor cores based on the workload performance of each task,
wherein the first processor cores comprise higher performance processors than the second processor cores, and
wherein the first processor cores are high-performance processor cores, and the second processor cores are low-performance processor cores.

2. The method of claim 1, wherein each of the first processor cores is a minimum entity with a processing capability for executing instructions of the high-workload tasks.

3. The method of claim 1, wherein the low-performance processor cores are low-power processor cores.

4. The method of claim 1, wherein a performance control condition that is related to the application comprises application execution, loading of a website, downloading or uploading of content, an operating system booting up, or wired/wireless data transmission.

5. An electronic device comprising:
a heterogeneous multi-core processor including first processor cores and second processor cores, wherein the heterogeneous multi-core processor is configured to:
detect an event that triggers a performance control condition,
generate a plurality of tasks based on executing an application,
classify the plurality of tasks based on workload performance of each task, into high-workload tasks or low-workload tasks, wherein the high-workload tasks are assigned to the first processor cores and the low-workload tasks are assigned to the second processor cores, and wherein the workload performance of the high-workload tasks is above a threshold value, and the workload performance of the low-workload tasks is below or equal to the threshold value,
detect a touch input related to the application, while processing the high-workload tasks in the first processor cores and the low-workload tasks in the second processor cores,
in response to the touch input, migrate a portion of the low-workload tasks from the second processor cores to the first processor cores regardless of a power level of the electronic device,
process the migrated portion of the low-workload tasks and the high-workload tasks in the first processor cores, and
when no touch input is detected for a preset time in connection with the application, migrate a portion of the low-workload tasks that were migrated to the first processor cores to any one of the second processor cores based on the workload performance of each task,
wherein the first processor cores comprise higher performance processors than the second processor cores, and
wherein the first processor cores are high-performance processor cores, and the second processor cores are low-performance processor cores.

6. The electronic device of claim 5, wherein the first processor cores and the second processor cores constitute one or more independent processors.

7. The electronic device of claim 5, wherein the performance control condition comprises application execution, loading of a website, downloading or uploading of content, an operating system booting up, or wired/wireless data transmission.

8. The electronic device of claim 5, wherein each of the first processor cores is a minimum entity with a processing capability for executing instructions of the high-workload tasks.

9. The electronic device of claim 5, wherein the first processor cores are the high-performance processor cores and the second processor cores are the low-performance processor cores.

10. The electronic deVice of claim 9, wherein the low-performance processor cores are low-power processor cores.

11. A non-transitory storage medium storing instructions causing an electronic device to execute a task scheduling method, wherein the instructions, when executed by the electronic device, are configured to cause the electronic device to:
generate a plurality of tasks based on executing an application;
classify the plurality of tasks based on workload performance of each task, into high-workload tasks or low-workload tasks, wherein the high-workload tasks are assigned to first processor cores and the low-workload tasks are assigned to second processor cores, and wherein the workload performance of the high-workload tasks is above a threshold value, and workload performance of the low-workload tasks is below or equal to the threshold value;
detect a touch input related to the application, while processing the high-workload tasks in the first processor cores and the low-workload tasks in the second processor cores;
in response to the touch input, migrate a portion of the low-workload tasks from the second processor cores to the first processor cores regardless of a power level of the electronic device;
process the migrated portion of the low-workload tasks and the high-workload tasks in the first processor cores; and
when no touch input is detected for a preset time in connection with the application, migrate a portion of the low-workload tasks that were migrated to the first processor cores to any one of the second processor cores based on the workload performance of each task;

wherein the first processor cores comprise higher performance processors than the second processor cores, and
wherein the first processor cores are high-performance processor cores, and the second processor cores are low-performance processor cores.

\* \* \* \* \*